Figure 1:
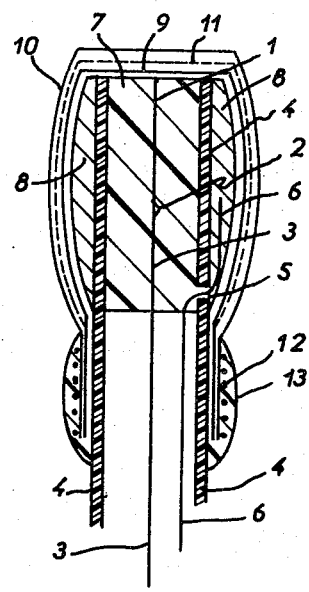

United States Patent [19]
Rybak

[11] 3,791,376
[45] Feb. 12, 1974

[54] MICROSONDE FOR CATHETER USE, FOR THE CONTINUOUS MEASUREMENT OF PARTIAL OXYGEN PRESSURE

[76] Inventor: Boris Rybak, 35, Avenue du 6 Juin, Caen, Calvados, France

[22] Filed: Dec. 14, 1970

[21] Appl. No.: 97,948

[52] U.S. Cl............... 128/2 E, 128/2 L, 128/2.1 E, 204/195 B
[51] Int. Cl.............................................. A61b 5/00
[58] Field of Search.. 128/2 E, 2 G, 2 L, 2 R, 2.1 E, 128/2.1 R; 204/195 B, 195 P, 195 M

[56] References Cited
UNITED STATES PATENTS

| | | | |
|---|---|---|---|
| 3,575,836 | 4/1971 | Sternberg | 204/195 P |
| 3,562,130 | 2/1971 | Hoole et al. | 204/195 M |
| 3,098,813 | 7/1963 | Beebe et al. | 204/195 P |
| 3,415,730 | 12/1968 | Haddad | 204/195 P |
| 3,492,216 | 1/1970 | Riseman et al. | 204/195 M |
| 3,000,805 | 9/1961 | Carritt et al. | 128/2 E X |
| 3,278,408 | 10/1966 | Leonard et al. | 204/195 P |
| 3,259,124 | 7/1966 | Hillier et al. | 128/2.1 E |
| 3,476,670 | 11/1969 | Weiner | 128/2.1 E X |

FOREIGN PATENTS OR APPLICATIONS

| | | | |
|---|---|---|---|
| 259,722 | 6/1965 | Australia | 128/2 E |
| 1,091,568 | 11/1967 | Great Britain | 204/195 P |

OTHER PUBLICATIONS

Kreuzer, F. et al., Science, Vol. 128, Oct. 1958, pp. 1,005 & 1,006.

*Primary Examiner*—Kyle L. Howell
*Attorney, Agent, or Firm*—Karl W. Flocks

[57] ABSTRACT

Microsonde for catheter use, operating under the principle of oxygen polarography, namely intended for continuous and instantaneous determination of oxygen partial pressure in blood vessels. The measurement head of said sonde has a diameter of 0.6 mm, comprises a platinum wire as a cathode and a paste containing powdered silver as anode. The head is covered with a first membrane of collodion against said anode, an electrolyte-impregnated support and a selectively gas-permeable thin membrane.

7 Claims, 2 Drawing Figures

PATENTED FEB 12 1974 3,791,376

MICROSONDE FOR CATHETER USE, FOR THE CONTINUOUS MEASUREMENT OF PARTIAL OXYGEN PRESSURE

The present invention relates to a micro-sonde for catheter use, of simple construction, for the continuous measurement of partial oxygen pressure ($pO_2$) in all penetrable media and particularly in blood vessels.

The choice of a measurement instrument is dictated by criteria for precision, reliability, sensitivity, and dimensions, as well as ease of construction and manufacturing cost, according to adaptation of the design to a particular application. It was therefore deemed important to develop catheter-electrodes for $pO_2$ measurement having low cost and which are fast as well as simple to construct, so that even if a certain percentage of waste due to production defects must be taken into consideration and, furthermore, the performance obtained is not rigorously that which would be obtained by catheter-electrodes of high precision, nevertheless, in weighing the chances of good performance, this would be compensated by the fact that the new instruments can be justified on economic grounds which, of course, does not exclude that by the application of particular care to such fabrication, one obtains instruments which combine great reliability with low cost and then can be considered as a disposable $PO_2$ probe.

It is an object of this invention to provide under the category of new industrail products, a microsonde specifically for use as a catheter in small diameter blood vessels (~0.6–0.8 mm.) - which is particularly significant for neurological applications - and which, in addition, involves no manufacturing difficulties.

The description of the different aspects of large-scale production is given here; these different phases show the principle of the assembly operations and are therefore not intended as limitations of all conceivable variations and modalities.

Figure 2:
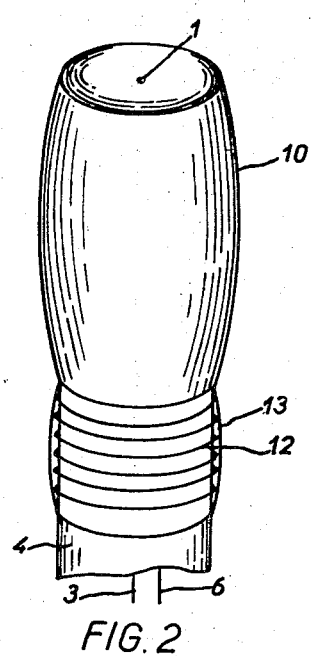

The invention relates to electrodes operating on the classical principle of oxygen polarography. The structure and the assembly steps, for example, are as follows, referring to the annexed drawings in which FIG. 1 is an enlarged vertical longitudinal section through the axis of a micro-sonde according to the invention and FIG. 2 is an enlarged external view of said microsonde.

1. A platinum wire 1 having a diameter of 17 microns, for example, is soldered at 2 to a copper wire 3, for example, shellacked or enamelled, whose length is adjusted to the total length of the eventual catheter-electrode, and having a diameter of 1/10 mm., the insulation having first been removed at the soldering points 2. This assembly is threaded into a tube 4 made of plastic or other material, polyethylene, for example, with an outside diameter of 0.5 to 0.6 mm., in such a way that the platinum wire extends considerably - about 1 cm. - beyond this tube-catheter.

2. At a distance of about 3 – 5 mm. from the forward end of the tube-catheter from which the wire extends beyond said tube 4, a small hole 5 is pierced through (preferably of 3/10 mm. diameter) at a point on said tube-catheter axis; through this hole 5, a shellacked copper wire 6 of the desired length is introduced having first removed, by sandpapering, for example, this shellac from the forward portion of the wire which thus extends from the tube for a length which corresponds favorably to a distance in the order of a few millimeters.

3. A water-repellant resin 7 with fast polymerization characteristics, is then introduced to fix into position, on the one hand, the coaxial copper-platinum wire and, on the other hand, to cement the hole 5 through which the lateral wire 6 was introduced. After drying, which can be reduced to a few hours for certain resins at a suitable temperature such as 40 C, there is prepared on a surface of chemically-inert material, a mixture of silver paste of variable proportions, but with other proportions which can be envisioned, of for example, one part of powdered silver; consisting preferably of granules in the order of 37 to 160 microns and one part of a fast-drying cement such as the type manufactured under the Trademark "Flexiple", for example, but which can be any dispersion in water or other medium or various resins such as plasticized polyvinyl acetate. This mixture 8 is then immediately applied to the forward portion of the tube, care being taken that the lateral uninsulated copper wire 6 is placed along the axis of the cylindrical tube and to carry out this application uniformly over the surface of the cylinder along a sufficient length so that it covers, to the edge of the end of the tube, the extending portion of the uninsulated copper conductor prepared in the previously described manner.

4. After drying, a minimal length of section is sliced off perpendicularly from the end of the sonde, by means of a razor blade, for example, so that the platinum wire 1 which serves as cathode and the silvered coating 8 which serves as the anode after chloridizing, present a fresh cross-section. The silver paste is then suitably chloridized as, for example, by electrolysis of an alkaline chloride at 1.5 volts for 20 seconds or at 6 volts for 5 seconds.

5. No polishing of the cathode is required. For certain high-precision assemblies, this cathode can be centered during the first part of the procedure by use of a narrow tube made of poly-ethylene, for example, which fits the internal cylindrical space of the tube having 0.5–0.6 mm outside diameter.

6. The measurement head is completed by: a. dipping the forward portion of the electrode, along the entire length of the dried anodic mixture deposited on it, into a diluted medium such as a diluted etherized solution or sol of collodion or any other similar membragenic substance (at 0.5 percent for example), the collodion being immediately distributed by a gas jet (air, oxygen, nitrogen, for example); this collodion deposit 9 suitably replaces the application of a usual cellophone membrane; b. attaching a membrane 10 permeable only to gas - made of a material manufactured under the Trademark of "Teflon", for example - whose thickness is preferably about 6 microns, in such a way that this membrane encases the length of the cylinder which has a 0.5 – 0.6 mm. outside diameter, an electroylte-support solution 11 being located between this membrane and the collodion membrane 9 consisting, for example, of potassium chloride of a suitable concentration of 0.2 M. impregnated in a support such as a "nylon" network, a gel, or "joseph" paper. This membrane is then wrapped with silk, or nylon thread 12 or thread of other suitable material and the wrapping, a rough region, is covered by a layer 13 of collodion in order to obtain a smooth surface to facilitate the catheterization, and contributing to its proper functioning.

The polarograms obtained with such micro-sondes for measuring $pO_2$ show the proper shape. These micro-sondes operate generally between 600 and 700 mv. They generally furnish about 80 percent of the response obtained when submerging them, under BTPS (Body Temperature ambient Pressure water Saturation at 37°C) conditions, into 100 percent oxygen, the results being obtained in 2 to 4 seconds, with a four-fold increase of the nanoamperic BTPS value obtained in air. These microsondes are hardly affected by the kinetic influences of the liquid medium into which they are submerged and also show a long operating life. Second choice specimens are considered to be those sondes which do not provide such performance; for example, which have low sensitivity, but which, for certain applications, can be properly used which further reduces the overall cost of a production run. The use of these new type of sondes is recommended any time there is a question of measuring $pO_2$ in fluid regions of small dimensions.

The present invention therefore provides:

1. A new industrial product, in the form of a miniaturized micro-sonde whose outside diameter, including two membranes, could be about 0.6 mm., as a micro-sonde for the continuous and instantaneous determination of $pO_2$ in the interior of a fluid.

2. In such a sonde, the following are the characteristics with respect to materials and assembly:

a. Use of a small-diameter catheter and substitution of a usual silver anode by a mixture composed of a water-repellant cement preferably having fast-drying characteristics, and powdered silver, the mixture being placed all around the forward end of the tube-support over a variable length which should not exceed about 5 mm. This anode is connected to a conducting wire by immersing a copper wire, for example, uninsulated and of small diameter, into this adhesive mixture, the wire penetrating into the catheter (the wire here being insulated by shellac or enamel) through a small-diameter hole pierced some distance from the end which forms the head of the sensor, whose cathode preferably consists of a platinum wire with 17 microns diameter, preferably centered, but not necessarily, by the use of a small-diameter tube suited to the internal diameter of the catheter support and preferably cemented in all cases with a fastpolymerizing resin.

b. Replacement of the usual internal cellophane membrane by a deposit of collodion, preferably distributed during application of the collodion by a jet of gas, such as oxygen or air, for example.

3. A method for the manufacture of such a type of micro-sonde.

The order of assembly and, in particular, the chloridizing of the anode and the positioning of the membrane made of "Teflon", for example, and the electrolyte-support, are carried out as indicated above and particular emphasis is placed on the necessity for producing a smooth surface by a suitable coating over the rough region of the wrapping when used in clinical, medical and veterinary applications as well as in work with experimental animals.

I claim:

1. A disposable miniaturized cathetized micro-sonde for polarographic continuous and instantaneous determination of the partial pressure of oxygen within any penetrable medium having a maximum outside diameter of substantially 0.6 mm and comprising a catheteric tube support of a plastic material having a forward end and a back end;

an anode placed around said forward end composed of a chloridized hardened mixture of a water repellant cement and powdered silver;

an electrical conducting wire having a portion of one end imbedded in said hardened mixture with said wire passing through a hole in said tube support and having insulation on a portion extending out of said back end of said tube support;

a cathode within said forward end of said tube support constituted by a platinum wire having a diameter of substantially 0.01 mm coaxially soldered to a copper wire, said platinum wire emerging at said forward end of said tube support and said copper wire;

an inert filling in said tube imbedding said platinum wire;

a first thin membrane of collodion formed in situ for equi-diffusion of oxygen externally surrounding said forward end of said tube support including said anode and said cathode;

a second thin membrane of selectively gas permeable material surrounding said first membrane and having a thickness of substantially six microns;

a thin support impregnated with an electrolytic solution located between said first and second membranes; and a third of textile material covered with a layer of collodion wrapping said second thin membrane.

2. The miniaturized micro-sonde of claim 1, further characterized by
said inert filling being constituted by a water repellant resin.

3. The miniaturized micro-sonde of claim 1, further characterized by
said hardened mixture comprising approximately one part of said powdered silver having granules ranging substantially between 37 to 160 microns in size to one part of said cement.

4. The miniaturized micro-sonde of claim 1, further characterized by
said electrolytic solution being an aqueous 0.2 M solution of potassium chloride.

5. The miniaturized micro-sonde of claim 4, further characterized by
said thin support being of a textile material.

6. The miniaturized micro-sonde of claim 4, further characterized by
said thin support being of paper.

7. The miniaturized micro-sonde of claim 4, further characterized by
said thin support being of gel.

* * * * *